Aug. 17, 1965   F. A. WOOD ETAL   3,200,534
ANIMAL AND WILD GAME TRAP
Filed Jan. 19, 1962   2 Sheets-Sheet 1

INVENTORS
FRED A. WOOD
JOSEPH A. GORDON
BY
Carl R. Brown

ATTORNEY

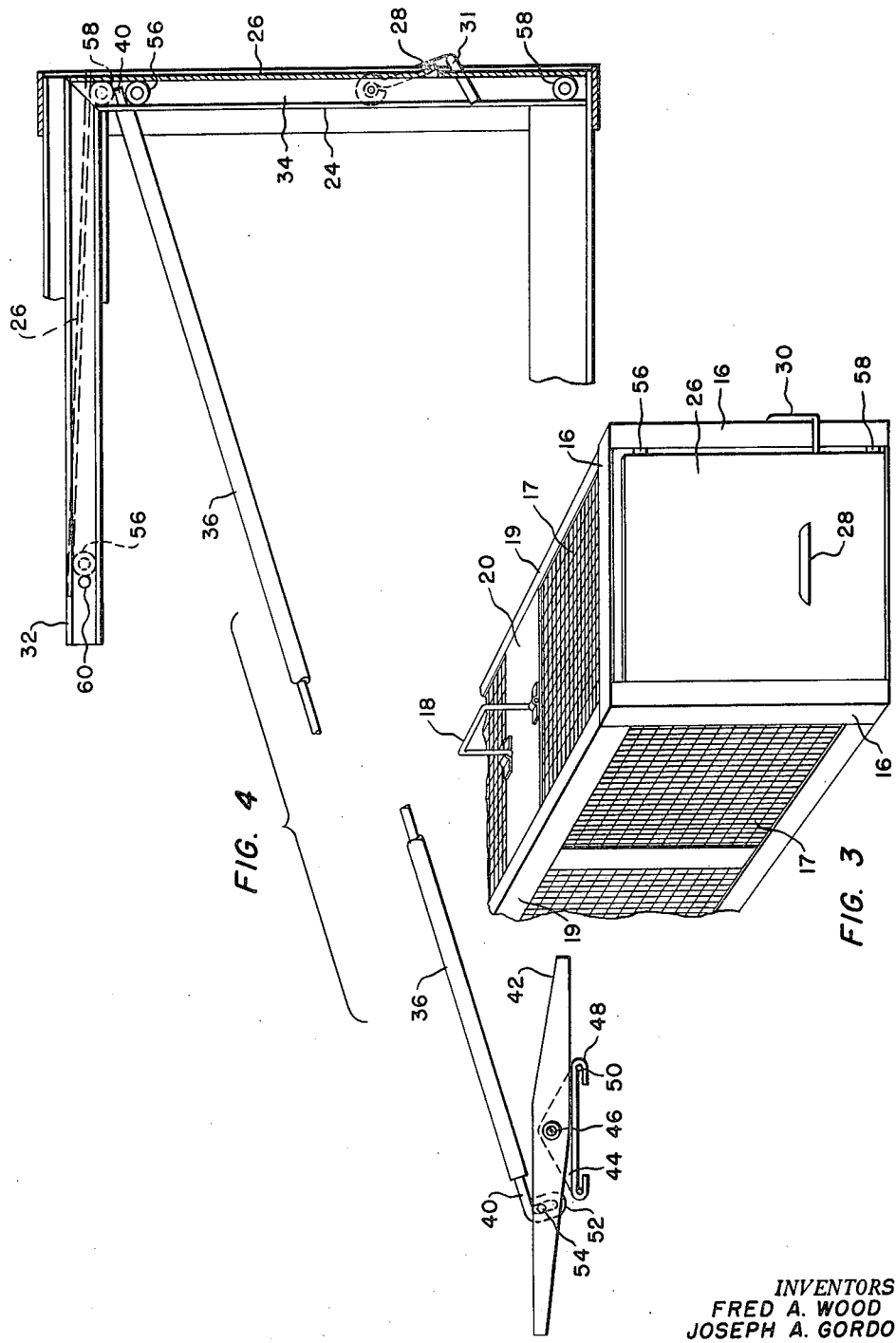

United States Patent Office 3,200,534
Patented Aug. 17, 1965

3,200,534
ANIMAL AND WILD GAME TRAP
Fred A. Wood, 2916 Broadway St., and Joseph A. Gordon, 2536 University St., both of San Diego, Calif.
Filed Jan. 19, 1962, Ser. No. 167,298
3 Claims. (Cl. 43—61)

This invention relates to traps and more particularly to traps for trapping animals and wild game.

There are many traps in the art that operate with varying degrees of effectiveness in accomplishing their primary function of trapping animals or wild game. Most of such traps either use a vertically sliding door to close the entrance to the trap or use a pivoting door member. The vertically sliding door approach has the disadvantages of having the door extend outwardly from the trap enclosure or having the entrance to the trap reduced in size to a restricted opening. Either approach restricts the trap's usefulness. The outwardly projecting door makes the trap difficult to place and makes the trap's appearance less inviting to the animal. Restricting the opening to the trap, of course, greatly restricts its usefulness, since the inner volume of the trap has to be considerably larger than the size of the animal that can squeeze through the entrance, if any animal would want be squeeze through such an entrance. As to the swinging or pivoting door approaches, such arrangements seriously reduce the usable volume in a trap, unless the door projects outside the trap. Because when the door swings from inside the trap to close a full size entrance opening, the door, which thus has considerable size, sweeps out a corresponding volume of the volume in the trap's enclosure. This "sweep out" volume becomes unusable, since it cannot be considered to be volume suitable for occupancy by the animal that is tripping the trap. If the animal is in this "sweep out" space when the trap is tripped, the swinging door will most likely strike the animal thereby keeping the door from closing and permitting the animal to back out of the trap.

It is therefore an object of this invention to provide and improved trap for trapping animals and wild game.

It is another object of this invention to provide an improved animal and wild game trap with a door closing mechanism that operates in a rapid and reliable manner.

It is another object of this invention to provide an improved animal and wild game trap housing a door for closing the entrance, which door does not extend outside the trap or to any great extent within the volume of the trap in any of its positions between open and closed positions.

It is another object of this invention to provide an animal and wild game trap having separate and complementary means of locking the door of the trap against reopening by the trapped animal or wild game after the trap has been tripped and closed.

It is another object of this invention to provide an animal and wild game trap having improved lateral stability.

It is another object of this invention to provide an improved animal and wild game trap in which the force required to trip the trap can be varied to correspond to the weight of animals desired to be trapped.

It is another object of this invention to provide an improved animal and wild game trap in which the door can be locked after various stages of closing.

It is another object to provide an improved animal and wild game trap having a door closing mechanism that will operate rapidly and effectively even though the trap may be in a tilted position.

It is another object of this invention to provide an improved animal and wild game trap in which substantially the full volume of the trap may be effectively used in enclosing the animal before and during the time the trap is tripped.

These and other objects will become more apparent when read in light of the accompanying drawing in which;

FIGURE 3 is a perspective view of the entrance end of an embodiment of the invention;

FIGURE 4 is a diagrammatic view of the trip and door closing mechanism of the invention.

Figure 1:
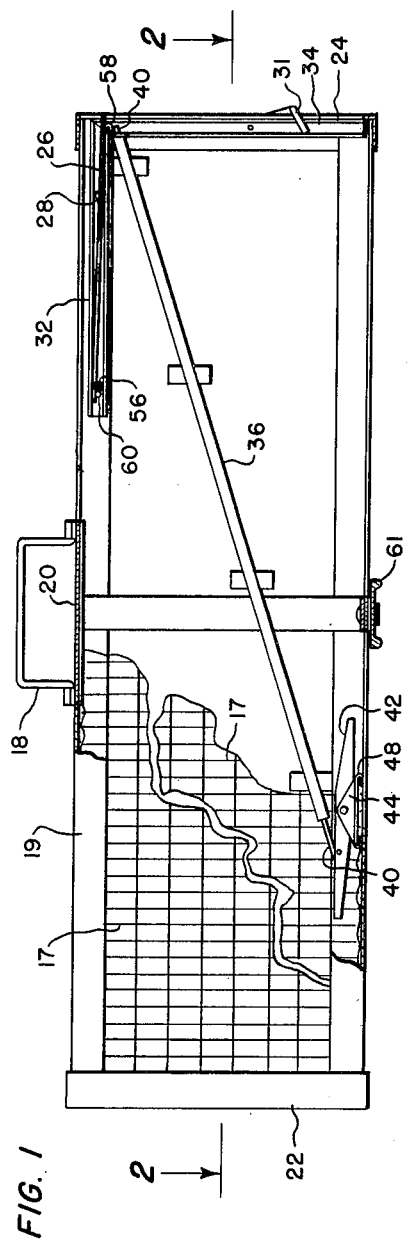
FIGURE 1 is a side view, part in section and part broken away, of an embodiment of the invention.
Figure 2:
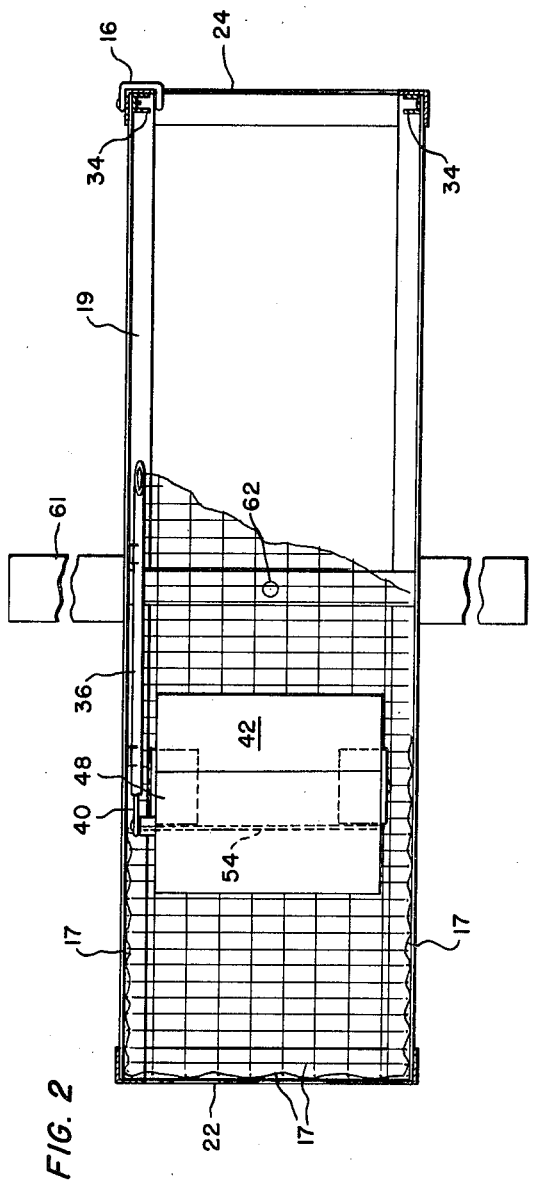
FIGURE 2 is a view taken along lines 2—2 of FIGURE 1.

Referring to FIGURES 1, 2 and 3, the trap comprises a rectangular, box-shaped enclosure with opposite end frame members 16 joined by longitudinal frame members 19. The end frame members 16 frame a closed end 22 and a selectively open entrance end 24. The size of the framed opening in entrance end 24 corresponds substantially with the cross-sectional area of the volume of the enclosure. Thus the entrance opening affords full and unrestricted movement into the trap by the animals or wild game to be trapped. The frame members 16 and 19 as well as the entire trap structure may be constructed of steel or suitable like materials. All sides of the enclosure, with the exception of entrance end 24, are enclosed by a suitable wire mesh 17. The trap has a handle 18 that may be used for carrying the enclosure and whatever animals or wild game that may be captured therein. A plate 20 secured between longitudinal frame members 19 and underneath the handle 18 protects the carrier's hand from game caught in the enclosure that may attempt to injure the carrier's hand through the mesh 17. The trap enclosure has a sheet metal door 26 with means for translating the door between open an closed positions, which means rolls or slides the door into a locked position of closing the open entrance end 24 in a manner as will be more apparent hereinafter. The door 26 has a cut out handle portion 28 in its outer surface of grasping and raising the door 26.

A pair of longitudinal U-shaped channel members 34 are each secured to the inner surface of the vertical frame members 16 that frame the entrance opening. A pair of longitudinal U-shaped channel members 32 are secured to the inner surface of the upper frame members 19 at the point of their intersection with the aforesaid vertical frame members 16. Channel members 32 coact with channel members 34 to provide a channelled path for rollably carrying rollers 56 and at times rollers 58, see FIGURES 1 and 4, which rollers support and translate the door 26. Rollers 56 and 58 are attached adjacent to the four corners of the door 26 as shown in FIGURES 3 and 4 of the drawings. When the trap has been set and is ready to be tripped, the door 26 is positioned substantially horizontal to the enclosure, parallel to channels 32 and at an angle normal to the entrance opening. In this position, rollers 56 rest in channel members 32 against stop member 60 that prevents rollers 56 from rolling out the open ends of channels 32. Rollers 58 are in channel 34 at the top edge of the channel where it interesects with channel 32. Stop member 60 is so positioned to prevent movement of roller 56 and door 26 in channel 32 to the point that rollers 58 would be in channel 32. Thus roller 58 stays in channel 34 in a position to drop in channel 34 causing door 26 to close the entrance opening. In this position, the door 26 can be dropped and under gravitational urging will move to rapidly close the entrance. A pivot rod 40, carried in tubular member 36, projects into channel member 34 and its end supports roller 58 from dropping down channel member 34. When rod 40 is moved longitudinally away from channel member 34, the end of rod 40 that supports rollers 58 and door 26 is moved permitting roller 58 to drop along channel 34. The weight of the door causes the door and roller 58 to move downwardly pulling roller 56 along channel 32. Door 26 thus rolls very rapidly into its position of closing open end 24 of the trap, as shown in FIGURE 3.

A rocker trip pan 42, see FIGURES 1, 2 and 4, is supported by a fulcrum 48 on the mesh 17 that forms the bottom of the trap enclosure. Fulcrum 48 comprises pairs of vertically-positioned, triangular-shaped, fulcrum members 44 that are secured at right angles to horizontal members 48 which in turn are attached to the mesh 17. The trip pan 42 is secured to fulcrum members 44 by tension or drag adjusting screws 46 that may be adjusted by a screwdriver or the like to provide frictional restriction to the pivotal movement of the trip pan 42 relative to the fulcrum 44. A shaft 54 is connected just underneath the surface of the trip pan 42 along one of its sides. One end of the shaft 54 projects into an offset, hook-type, eyelet portion 52 on the end of rod 40. When said one side of the trip pan 42 is in the up position, then shaft 54 will be in the upper portion of eyelet 52. However, when the one side of the trip pan 42 is rotated in a counter-clockwise direction around fulcrum 44 to the low position; then the one end of shaft 54 moves downwardly in the eyelet 52 causing rod 40 to be drawn longitudinally toward the trip pan 42 and away from channel 34 through tubing 36, thereby releasing rollers 56 and door 26 for movement to close the opening in entrance 24.

In operation, an animal enters the trap enclosure through open end 24 and then proceeds to a point of walking onto trip pan 42. The weight of the animal on the one side of the trip pan causes the trip pan to rotate in a counterclockwise direction around supporting screws 46 moving the one end of shaft 54 downwardly in eyelet 52 and causing rod 40 to move longitudinally in tubing 36 opening channel 34 and allowing rollers 58 to drop downwardly in channel 34 pulling the door 26 and rollers 56 thereafter. Thus the door 26 moves to close open entrance 24 and trap the animal therein. Thereafter should the animal return to the end 24 in an attempt to open the door 26, the animal would probably step on the other side of trip pan 42 rotating trip pan 42 in a clockwise direction around pivot 46 and causing rod 54 to move upwardly in eyelet 52. This forces rod member 40 to move within sheathing 36 toward end 24 in a manner that the end of rod 40 again projects into channel 34. This time the end of rod 40 prevents upward movement of rollers 56 locking door 26 in its closed position. As a further means of locking the door in the closed position, a lock member 30 is attached to one of the vertical frame members 16 and has a downwardly projecting hook portion 31, that hooks around member 16 and lays across one of the channels 34 near the bottom of the opening 24. The hooked portion 31 is thus in a position to oppose or prevent upward movement of rollers 58 in channel 34. When the trap is tripped by rotation of pan 42, the door 26 falls by gravity to a point where roller 58 encounters hook portion 31 and pushes latch member 30 forward and out of position. After the passing of rollers 58, lock member 30 falls back in position across channel 34 and prevents upward movement of roller 58 thus locking the door 26 in the closed position. By appropriately placing latch members 30 along vertical channel 34, the door 26 can be locked in several semiclosed positions. Should part of the animal not completely enter the trap, such as his tail, the door 26 will still be closed as much as is possible and should this movement permit the rollers 58 to pass latch member 30, then the door 26 will be locked in this position. This position will normally be sufficient to keep the animal in the trap. This locking arrangement aids in preventing the animal from backing out of the trap after preventing the door from closing completely.

A longitudinal stabilizing member 61 is rotatively secured to the bottom side of the trap by bolt 62. To horizontally stabilize the trap, member 61 is pivotally rotated around bolt 62 to the point that its length is perpendicular to the rectangular length of the trap enclosure.

The vertically-raising, gravity-closing door 26, permits substantially all of the space in the trap to be available for enclosing the trapped game, since the door does not interfere with the internal volume of the trap when the door is in either the open or closed position. This full utilization of the trap's volume is possible without having members project outwardly from the trap, which outwardly projecting members interfere with using the trap and make the game wary. When the trap is tripped by an animal or wild game and the door 26 is released, it projects into the internal volume of the trap during the closing movement, only to the extent of a small portion of the upper corner of end 24. Accordingly the door of the trap will not normally strike the animals or wild game during closing and the often occurring problem of having animals or wild game stopping the door midway of its closing and then successfully backing out of the trap is considerably reduced, if not eliminated.

The door of the trap is locked by a triple lock arrangement. The first locking arrangement is when the end of rod 40 is pushed back into channel 34 preventing upward movement of the rollers 56. The second locking arrangement is when lock member 30 is swung into position across channel member 34 after the passage of roller 58 to prevent upward movement of rollers 58. Also when rollers 56, see FIGURE 4, drop below the horizontal level of channel member 32, then without vertical movement upwardly of the entire door 26, rollers 56 cannot move down channel 32.

By adjusting the tension on screw member 46, the force required to trip the trap, that is the force to move trip pan member 42 around pivot member 46, can be set as desired. Since the trap is tripped by the force of the weight of the animal, the trap can be adjusted to trip only when an animal of the desired weight trips the trap.

Another adjustment as to the weight of the animal that can trip the trap may be effected by selectively adjusting the rotational position of trip pan 42 relative to the fulcrum members 44. This in turn adjusts the extent that the end of rod 40 extends into channel 34. It has been found in operating the trap that the force required to pull rod 40 from its position of supporting roller 58 increases with the amount of rod 40 projecting into channel 34 and under roller 58. This can be attributed among other reasons to the portion of the weight of the door supported by rod 40 and to the friction encountered by rod 40 in moving through sheath 36. Thus in setting the trap the operator with one hand holds the door 26 in the open position and with the other hand rotates trip pan 42 to the position where the end of rod 40 extends the desired amount under roller 58. By adjustment of trip pan 42 the desired tripping force can be established.

Various modifications are contemplated and may obviously be resorted to by those skilled in the art without departing from the spirit and scope of the invention as hereinafter defined by the appended claims.

We claim:
1. A trap for trapping animals and wild game comprising,
   an enclosure having an entrance,
   a door for said entrance movable to open and closed positions and gravitationally urged toward said closed position,
   said door in said open position being angularly positioned relative to said entrance, support means for releasably supportng said door in said open position, means for translating said door between said open and closed positions in a manner that said door is moved between open and closed positions by translation, game actuable means in said enclosure for shifting said support means out of said door-supporting position in response to actuation of said actuable means by said game, and means for varying the force required to actuate said actuable means.

2. A trap for trapping wild game comprising, a box shaped enclosure having an entrance opening, a door for said entrance movable to open and closed positions and gravitationally urged toward said closed position, said door having connecting rollers on each of its sides adjacent each of its ends, channel means on each side of said entrance for carrying said rollers and said door, said channel means including pairs of intersecting channel members with ones of said members being connected to the top edge of said enclosure adjacent said entrance end and the other of said members being attached to the vertical edge of said entrance opening, a longitudinally shiftable trip rod having opposite end portions and being slidably supported by said enclosure with one of said ends projecting into said other of said members, said door in said open position being supported by said rollers in said channels with ones of said rollers on the upper end of said door being supported in said ones of said members and with the other of said rollers at the other end of said door being supported in said other of said members by said one end of said trip rod, a game-depressible platform in said enclosure, means operatively connecting said platform and the other end of said trip rod for shifting said one of said ends of said rod out of roller-supporting position upon depression of said platform by said game allowing said rollers to move under said gravitational urging to said closed position wherein all said rollers are positioned in said other members, and stop means in said ones of said members for preventing movement of said ones of said rollers in said ones of said members a distance from said entrance greater than the height of said door.

3. A trap for trapping animals or wild game comprising, an enclosure having an entrance opening, a door for said entrance movable to open and closed positions and gravitationally urged toward said closed position, said door having roller support means that includes rollers, channel means on each side of said entrance for carrying said roller support means and said door, said channel means including a plurality of channel members, a longitudinally shiftable trip rod having opposite end portions and being slidably supported by said enclosure with one of said ends projecting into one of said channel members, at least one of said rollers being capable of resting on said one of said rod ends projecting into said channel member and thereby supporting said door in the open position, a game-depressible platform in said enclosure being connected to the other of said ends of said trip rod, said platform when actuated by said game being capable of shifting said one of said ends out of roller-supporting position allowing said door to move under said gravitational urging to said closed position, and the extent to which said one of said ends of said rod extends into said channel member being selectively adjustable by adjusting the position of said platform thereby adjusting the force required to actuate said platform and trip the trap.

References Cited by the Examiner

UNITED STATES PATENTS

| | | | |
|---|---|---|---|
| 443,975 | 12/90 | Pead | 43—61 |
| 665,847 | 1/01 | Barton | 43—61 |
| 721,472 | 4/03 | Hegbom | 20—32 |
| 1,291,591 | 1/19 | Merdith | 43—96 |
| 2,551,903 | 5/51 | Roberts | 43—61 |

SAMUEL KOREN, *Primary Examiner.*

ABRAHAM G. STONE, *Examiner.*